United States Patent [19]

Marihart

[11] Patent Number: 4,786,307

[45] Date of Patent: Nov. 22, 1988

[54] CHELATED PLANT NUTRIENTS

[75] Inventor: John R. Marihart, Fresno, Calif.

[73] Assignee: Pacific Micro Minerals, Inc., Fresno, Calif.

[21] Appl. No.: 29,500

[22] Filed: Mar. 23, 1987

[51] Int. Cl.$^4$ .......................... C05F 11/02; C05G 3/00
[52] U.S. Cl. ........................................... 71/11; 71/24; 71/27; 71/DIG. 2
[58] Field of Search ..................... 71/1, 11, 23, 24, 27, 71/43, 64.01, 64.08, 64.10, DIG. 2

[56] References Cited

U.S. PATENT DOCUMENTS 2,093,047  9/1937  Hudig et al. ............................. 71/62
3,264,084  8/1966  Karcher ............................. 71/64.05

FOREIGN PATENT DOCUMENTS 0187423  5/1985  European Pat. Off. ................ 71/23

Primary Examiner—Ferris H. Lander
Attorney, Agent, or Firm—Townsend and Townsend

[57] ABSTRACT

Liquid micronutrient compositions are prepared by combining fulvic acid extracted from leonardite ore with a metal salt, a hydroxy acid and/or a hydroxy acid salt, and ammonia. The extract of leonardite ore is obtained by combination with a suitable chelant, while the subsequent combination with the metal salt and hydroxy acid/salt is accomplished in a heated aqueous medium. After allowing the desired metal chelates to form, the composition is combined with anhydrous ammonia, usually by sparging, to obtain a stable end product. The micronutrient compositions display enhanced plant uptake in both soil and foliar applications. Moreover, the compositions are particularly stable and suitable for application through drip irrigation systems.

20 Claims, No Drawings

CHELATED PLANT NUTRIENTS

BACKGROUND OF THE INVENTION

1. Field of the Invention

The present invention relates generally to the production of fertilizers, and more particularly to the preparation of chelated micronutrients, such as zinc, iron, manganese, magnesium, copper, calcium, and the like, for use in fertilizers.

Fertilizers usually consist of one or more of three primary nutrients: nitrogen, phosphorus, and potassium. In certain applications, it may be dsirable to add sulfur as a fourth primary nutrient. In addition to the primary nutrients, secondary nutrients (usually referred to as "micronutrients") are often added to the fertilizer in order to supplement elemental deficiencies which may exist in particular soils. As the need for micronutrients varies greatly from locality to locality, it is frequently desirable to provide micronutrients as discrete supplements which may be added to a primary fertilizer composition immediately prior to application in the field. Such supplemental micronutrients should be stable, compatible with a wide variety of primary fertilizers, and easily taken up by the plants to which they are applied.

Heretofore, such micronutrients, which typically are metal ions, have been provided as chelates with conventional chelants. While generally effective, such chelants do suffer from a number of problems. In particular, metal chelants of the prior art often display a relatively low uptake by the plants to which they have been applied, usually in the range from about 20 to 30%. In calcerous soils, the chelants become associated with magnesium and calcium ions, while in acidic soils, the chelants become associated with aluminum. In both cases, such association inhibits utilization of the micronutrient. In addition to the poor utilization, conventional metal chelants frequently provide an irregular crop response, are sometimes phytotoxic, and can precipitate when combined with certain incompatible fertilizer compositions. In addition, such metal chelants are generally unsuitable for foliar application.

For these reasons, it would be desirable to provide improved micronutrient chelants which provide for a high efficiency of uptake, are non-phytotoxic, are stable even when mixed with a wide variety of primary fertilizers, and which may be applied foliarly to plants with success.

2. Description of the Background Art

European patent application EPO No. 0164908, published on Dec. 18, 1985, describes the preparation of certain extracts of leonardite ore which are useful as compositions for promoting and modifying plant growth. These compositions are useful as a starting material in preparing the metal chelants of the present invention. Schnitzer (1980) Colloques Intertionaux du C.N.R.S., pgs. 229-234, describes the behavior of both fulvic and humic acids in soil.

SUMMARY OF THE INVENTION

The chelated micronutrient compositions of the present invention display enhanced uptake efficiency in both soil and foliar application with a wide variety of crops. Because of this, the micronutrients may be applied at reduced rates (when compared to conventional micronutrient chelants) and still maintain comparable or higher rates of uptake. The compositions have also been found to provide a uniform and predictable crop response under most circumstances and to be particularly stable and resistant to precipitation, even at low temperatures.

The chelated micronutrient compositions are prepared by first obtaining a fulvic acid extract of leonardite ore by combination of the ore with a suitable chelant, such as an ammonium or metal salt of a hydroxy acid, a glucamine, EDTA, HEDTA, DTPA, NTA, or the like, at a pH above about 2.5. The acid extract is combined with a cationic metal salt corresponding to the desired micronutrient in the presence of a hydroxy acid and, usually, a corresponding salt of the hydroxy acid. The combination is then exposed to anhydrous ammonia, usually by sparging, to obtain the final stable chelated product.

The micronutrient compositions may be applied to the soil or foliarly, and are particularly suitable for drip irrigation systems because of their resistance to precipitation.

DESCRIPTION OF THE SPECIFIC EMBODIMENTS

The chelated micronutrient compositions of the present invention are prepared by reacting a fulvic acid extract of leonardite ore with a metal cationic salt, a hydroxy acid, and anhydrous ammonia, as described in more detail hereinbelow. The metal salt is selected to provide the micronutrient of interest and the ammonia contributes to the stability of the final product as well as providing nitrogen.

Fulvic acids form one of the two main fractions of humic substances derived from soil humus. The other fraction includes humic acids. Fulvic acids consist in part of phenolic and benzenecarboxylic acids held together by hydrogen bonds. Studies indicate that fulvic acids contain aromatic and aliphatic groups extensively substituted with oxygen-containing functionalities, including numerous carboxyl groups. While both fulvic and humic acids are capable of chelating metals in the soil, the metal micronutrient chelants of the present invention surprisingly are successfully formed only with fulvic acids under the conditions set forth below.

1. Preparation of Leonardite Ore Extracts

Leonardite is a naturally-oxidized lignitic coal comprising a variety of humic acids, fulvic acids, and derivatives thereof. Preferred for use in the present invention are leonardite ores having a relatively high humic and fulvic acid content, such as that mined in North Dakota.

Fulvic acids and related compounds (but not humic acids) are selectively extracted from the leonardite by the process described in co-pending application Ser. No. 771,554, the disclosure of which is incorporated herein by reference. Briefly, the leonardite ore is crushed, usually to a mesh in the range from about 100 to 200, is reacted in a heated aqueous medium at a pH above about 2.5, usually in the range from about 4 to 6, in the presence of one or more organic chelating agents, to extract species which are positively charged in that pH range. By maintaining a pH above about 2.5, extraction of humic acid is avoided, while relatively completely extraction may be accomplished.

Suitable organic chelating agents include the group consisting of ammonium and metal salts of hydroxy acids such as gluconic acid, glucoheptoic acid, citric acid, tartaric acid, tartronic acid, galactaric acid, glucaric acid, glutaric acid, and glutamic acid, such metal salts including the sodium, potassium, copper, iron, magnesium, manganese, zinc, calcium, lithium, rubidium and cesium salts of such acids; the group consisting of glucamines, such as sodium glucamine, potassium glucamine, ammonium glucamine, copper glucamine, ferrous glucamine, magnesium glucamine, manganese glucamine, zinc glucamine, calcium glucamine, lithium glucamine, rubidium glucamine and cesium glucamine; and the group consisting of synthetic organic chelating agents, including ethylene diamine tetraacetic acid (herein referred to as "EDTA"), hydroxyethylene diamine triacetic acid (herein referred to as "HEDTA"), diethylene triamine pentaacetic acid (herein referred to as "DTPA"), nitrilo triacetic acid (herein referred to as "NTA"), and ethanol diglycine, as well as the ammonium salts and the metal salts thereof, most particularly the sodium salts.

The pH of the resultant aqueous composition of extracted fulvic acid derivatives must be adjusted to the range from about 11.5 to 12.5 by the addition of a strong base, such as NaOH, in order to stabilize the composition against degradation and to provide a prolonged potential shelf life.

2. Preparation of Metal Chelants

The leonardite ore acid extracts described above are used as chelating agents for cationic metal micronutrients, such as zinc, iron, manganese, magnesium, copper, calcium, and the like. The manner of preparation provides for a stable product which is efficiently absorbed from the soil by the treated plant.

The preparation is carried out in a reactor having systems for heating and cooling to maintain the temperature ranges set forth below. Initially, the leonardite extract is heated to a temperature in the range from about 80° to 120° F., usually being about 100° F. A hydroxy acid selected from the group consisting of citric acid, tartaric acid, malic acid, gluconic acid, ascorbic acid, and lactic acid, preferably citric acid, is added, and resulting mixture agitated, typically for about one hour. The hydroxy acid is added to about 5 to 30% based on the weight of the extract, usually being about 10 to 20%. A hydroxy acid salt is next added, usually corresponding to the previously-added hydroxy acid (i.e., the salt will be a citrate if the hydroxy acid is citric acid), and the mixture again agitated, typically for about 15 minutes. The hydroxy acid salt is added to about 10 to 50% based on the weight of the extract, usually being about 20 to 40%. The temperature is maintained in the range from about 80° to 120° F., usually about 100° F. during the additions and agitations just described.

One or more metal salts are next added to the mixture, corresponding to the desired micronutrient. Suitable salts include the following.

| Zinc | $ZnSO_4$ |
|---|---|
| | $ZnNO_3$ |
| | $ZnCl_2$ |
| Iron | $FeSO_4$ |
| | $FeNO_3$ |
| | $FeCl_2$ |
| | $FeCl_3$ |
| Manganese | $MnSO_4$ |
| | $MnCl_2$ |
| Magnesium | $MgSO_4$ |
| Copper | $CuSO_4$ |
| Calcium | $CaSO_4$ |

After salt addition, the mixture is agitated for about 1 hour. Anhydrous ammonia is then added, typically by sparging, through the mixture for about 30 minutes with the pH reaching about 7.5. Sparging is continued for about two hours with the temperature still maintained in the range from about 150° to 185° F. The addition of anhydrous ammonia is exothermic, and the reaction medium must be cooled to maintain the temperature in the range from about 135° to 185° F. The total weight of anhydrous ammonia added is equal to about 5 to 15%, usually about 10%, of the weight of the leonardite extract. After sparging, the temperature of the reaction mixture is lowered to about 125° to 145° F. and additional ammonia is added to adjust the pH from about 7.5 to 9 depending on the metal. Additional water is added to bring the product to a desired final concentration.

Exemplary formulations are set forth in Table 1.

TABLE 1

| | Quantity of Reactants[1] | | | | | | |
|---|---|---|---|---|---|---|---|
| Product | Leonardite Extract (lb) | Water (lb) | Hydroxy[2] Acid | Hydroxy Acid[2] Salt | Metal[2] Salt | Anhydrous Ammonia | Total Weight |
| 6.5% Zinc | 4,640 | 1,344 | 928 | 2,165 | 2,100 | 423 | 11,600 |
| 4.5% Iron | 4,840 | 972 | 1,100 | 1,100 | 2,585 | 403 | 11,000 |
| 4.0% Manganese | 5,016 | 1,436 | 1,026 | 1,938 | 1,630 | 354 | 11,400 |
| 3.0% Magnesium | 4,400 | 25 | 880 | 2,053 | 3,367 | 275 | 11,000 |
| 5.0% Copper | 4,884 | 1,443 | 555 | 1,665 | 2,209 | 344 | 11,100 |
| 2.5% Calcium | 4,850 | 1,178 | — | 2,086[3] | 1,277 | 309 | 9,700 |

[1]Quantities are sufficient for 1,000 gallon batch; all quantities stated in pounds.
[2]Dry weight.
[3]Sodium acetate.

3. Use of the Compositions of the Present Invention

Micronutrients are required in localities where one or more of such nutrients may be unavailable in the soil. Availability of a wide spectrum of micronutrients may be determined from soil samples by conventional techniques. From these samples, the identities and quantities of micronutrients needed to be added may be determined. Tissue and/or petiole samples from the growing plants allow monitoring of the targeted nutrients to assure that satisfactory levels have been taken up by the plants.

Usually, the chelated micronutrients will be combined with the preplant fertilizer, but they can also be effectively added in early sidedress applications. The fertilizer applications may be made directly to the soil, or may be accomplished by a foliar spray. The chelated micronutrients are particularly suitable for application by drip irrigation because they are very stable and resistant to precipitation even at relatively low temperatures. Usually, foliar application is used in addition to soil application in order to maintain optimal nutritional levels during the latter growth of the plants.

The micronutrients of the present invention are compatible with most fertilizers, insecticides, herbicides, fungicides, and the like. Usually, however, it is inadvisable to utilize the micronutrients with either antibiotics or growth regulators.

The compositions are suitable for use with a wide variety of vegetable crops, row crops, deciduous fruit and nut trees, grapes, citrus trees, olive trees, and ornamentals.

The following examples are offered by way of illustration, not by way of limitation.

EXPERIMENTAL

Two conventional zinc materials, zinc sulfate and an EDTA zinc chelate, were applied to the soil separately to blackeye peas at the rate of one ounce of actual ingredient per acre for each treatment. In the same field, a 6.5% zinc chelate prepared by the methods of the present invention was applied to the soil at a rate of 0.5 ounce per acre. Nine days after application, zinc uptake in the various plants was determined by conventional methods. The results are set forth in Table 2.

TABLE 2

| Composition | Zinc (ppm)[1] | Percent[2] Improvement |
| --- | --- | --- |
| Zinc sulfate | 37.5 | 19.5 |
| EDTA Zinc | 40.4 | 10.9 |
| 6.5% zinc chelate[3] | 44.8 | — |

[1] 10 to 20 replications.
[2] Relative to 6.5% zinc chelate.
[3] Prepared by the method of the present invention.

As can be seen, the chelate of the present invention provided improved zinc uptake compared to conventional chelates when applied to the soil.

Various forms of chelated iron were foliarly applied on fourth to fifth leaf corn plants in replicated treatments. In all cases, the chelated iron was applied at a rate of 28.46 grams per acre. The base of the fifth leaf was evaluated for iron uptake. The results are set forth in Table 3.

TABLE 3

| Composition | Iron (ppm) | Percent[1] Improvement |
| --- | --- | --- |
| Control | 39.0 | 24.9 |
| Ferrous lignosulfonate | 38.5 | 26.5 |
| Iron chelate | 38.7 | 25.8 |
| Stabilized ferrous sulfate | 42.4 | 14.9 |
| 4.5% Iron chelate[2] | 48.7 | — |

[1] Relative to 4.5% iron chelate.
[2] Prepared by the method of the present invention.

As can be seen, the chelate of the present invention provided improved iron uptake compared to conventional chelates when foliarly applied.

Although the foregoing invention has been described in some detail by way of illustration and example for purposes of clarity of understanding, it will be obvious that certain changes and modifications may be practiced within the scope of the appended claims.

What is claimed is:

1. A method for preparing a chelated micronutrient composition suitable for use as a plant nutrient, said method comprising:

obtaining a fulvic acid substantially free from humic acid by extracting a leonardite ore with a chelant at a pH above about 2.5;

combining the acid extract with a cationic metal salt in the presence of a hydroxy acid and/or a hydroxy acid salt to form a reaction mixture, and combining a sufficient amount of anhydrous ammonia with the reaction mixture to adjust the pH to the range from about 7.5 to 9.

2. A method as in claim 1, wherein the chelant is selected from the group consisting of ammonium and metal salts of hydroxy acids, glucamines, EDTA, HEDTA, DTPA, and NTA.

3. A method as in claim 1, wherein the hydroxy acid is selected from the group consisting of citric acid, tartaric acid, malic acid, gluconic acid, ascorbic acid, and lactic acid.

4. A method as in claim 1, wherein the metal salt is selected from the group consisting of $ZnSO_4$, $ZnNO_3$, $ZnCl_2$, $FeSO_4$, $FeNO_3$, $FeCl_2$, $FeCl_3$, $MnSO_4$, $MnCl_2$, $MgSO_4$, $CuSO_4$, and $CaSO_4$.

5. A method as in claim 1, wherein the leonardite ore is crushed and reacted with the chelant in a heated aqueous medium.

6. A method as in claim 1, wherein the fulvic acid, metal salt, hydroxy acid and/or hydroxy acid salt are combined in a heated aqueous medium.

7. A method as in claim 6, wherein both a hydroxy acid and a salt of a hydroxy acid are combined in the aqueous medium.

8. A method as in claim 7, wherein the hydroxy acid is citric acid and the hydroxy acid salt is a citrate.

9. A method as in claim 1, wherein the ammonia is combined by sparging through the reaction mixture.

10. A chelated micronutrient composition suitable for use as a plant nutrient, said composition comprising fulvic acid extracted from a leonardite ore with a chelant, combined with a metal salt in the presence of a hydroxy acid and/or a hydroxy acid salt and anhydrous ammonia, said composition being substantially free from humic acid.

11. A composition as in claim 10, wherein the chelant is selected from the group consisting of ammonium and metal salts of hydroxy acids, glucamines, EDTA, HEDTA, DTPA, and NTA.

12. A composition as in claim 10, wherein the hydroxy acid is selected from the group consisting of citric acid, tartaric acid, malic acid, gluconic acid, ascorbic acid, and lactic acid.

13. A composition as in claim 10, wherein the metal salt is selected from the group consisting of $ZnSO_4$, $ZnNO_3$, $ZnCl_2$, $FeSO_4$, $FeNO_3$, $FeCl_2$, $FeCl_3$, $MnSO_4$, $MnCl_2$, $MgSO_4$, $CuSO_4$, and $CaSO_4$.

14. A composition as in claim 10, wherein the fulvic acid has been extracted from the leonardite ore by crushing and reacting with the chelant in a heated aqueous medium.

15. A composition as in claim 10, wherein the fulvic acid extracted leonardite ore, metal salt, and hydroxy acid and/or hydroxy acid salt are combined in a heated aqueous medium for a minimum preselected period prior to combination with the ammonia.

16. A composition as in claim 15, wherein both the hydroxy acid and the hydroxy acid salt are combined in the heated aqueous medium prior to combination with the ammonia.

17. A composition as in claim 16, wherein the hydroxy acid is citric acid and the hydroxy acid salt is a citrate.

18. A composition as in claim 15, wherein the ammonia is combined by sparging.

19. A method for providing nutrients to plants comprising applying the composition of claim 10 to the soil around a plant.

20. A method for providing nutrients to plants comprising applying the composition of claim 10 to the leaves of the plant.

* * * * *